(12) United States Patent
Chen et al.

(10) Patent No.: US 12,040,637 B2
(45) Date of Patent: Jul. 16, 2024

(54) CHARGING METHOD AND CHARGING DEVICE

(71) Applicant: GETAC HOLDINGS CORPORATION, Taoyuan (TW)

(72) Inventors: Li-Shing Chen, Taipei (TW); Yng-Wei Lee, Taipei (TW)

(73) Assignee: GETAC HOLDINGS CORPORATION, Taoyuan (TW)

( * ) Notice: Subject to any disclaimer, the term of this patent is extended or adjusted under 35 U.S.C. 154(b) by 392 days.

(21) Appl. No.: 17/401,409

(22) Filed: Aug. 13, 2021

(65) Prior Publication Data
US 2022/0209548 A1 Jun. 30, 2022

(30) Foreign Application Priority Data
Dec. 25, 2020 (CN) .......................... 202011565088.3

(51) Int. Cl.
*H02J 7/00* (2006.01)
(52) U.S. Cl.
CPC .......... *H02J 7/0019* (2013.01); *H02J 7/0047* (2013.01); *H02J 7/007182* (2020.01); *H02J 7/0042* (2013.01)
(58) Field of Classification Search
None
See application file for complete search history.

(56) References Cited

U.S. PATENT DOCUMENTS

| 2012/0206105 | A1* | 8/2012 | Nishizawa | .......... | H01M 10/482 |
| | | | | | 320/134 |
| 2019/0199106 | A1* | 6/2019 | Grasshoff | ............. | H02J 7/0016 |

FOREIGN PATENT DOCUMENTS

TW        I662765 B        6/2019

* cited by examiner

*Primary Examiner* — Arun C Williams
(74) *Attorney, Agent, or Firm* — Locke Lord LLP; Tim Tingkang Xia, Esq.

(57) ABSTRACT

A charging method includes detecting whether two battery modules are balanced, simultaneously charging the two battery modules by a first charging current when the two battery modules are balanced, and executing a specific charging procedure when the two battery modules are not balanced. The step of executing the specific charging procedure includes charging by the first charging current a first battery module between the two battery modules that is not balanced and disconnecting the other between the two battery modules, and simultaneously charging the two battery modules by a second charging current upon the first battery module reaching balance, wherein the second charging current is less than the first charging current.

20 Claims, 10 Drawing Sheets

CHARGING METHOD AND CHARGING DEVICE

CROSS-REFERENCE TO RELATED APPLICATIONS

The present application claims priority to a Chinese Patent Application No. 202011565088.3, filed on Dec. 25, 2020, the disclosure of which is hereby incorporated by reference herein in its entirety.

BACKGROUND OF THE INVENTION

Field of the Invention

The present invention relates to a multi-battery charging technique, and more particularly to a charging method and a charging device.

Description of the Prior Art

Batteries (also referred to as battery modules) are primarily applied in portable electronic devices to promote mobility of the portable electronic devices. Accompanied by the development of green technologies in the recent years, applications of batteries have further extended to the field of automobiles and motorbikes, for example, hybrid electric systems, in aim of resolving issues of resource depletion and waste gas pollution encountered in the modern world. Further, based on environmental friendliness and practicability, reusable rechargeable batteries have become the commercial mainstream.

With respect to charging of multiple batteries, one charging method is sequentially charging batteries one after another by one single charging unit. Associated techniques and research may be referred from the TW Patent No. 1662765. Although the implementation of the circuit design for such charging method is simpler and occupies a smaller space, the overall charging time is longer. One other charging method is charging multiple batteries by multiple charging units in a one-on-one manner. The implementation of the circuit design of such charging method is more complex and occupies a larger space, leading to difficulties in reducing the overall area.

SUMMARY OF THE INVENTION

A charging method according to an embodiment includes detecting whether a plurality of battery modules are balanced, simultaneously charging the plurality of battery modules by a first charging current when the plurality of battery modules are balanced, and executing a specific charging procedure when the plurality of battery modules are not balanced. The step of executing the specific charging procedure includes charging a first battery module lower than a balance voltage, among the plurality of battery modules, by the first charging current and disconnecting the remaining of the plurality of battery modules, and simultaneously charging the first battery module and at least one battery module having the balance voltage among the plurality of battery modules by a second charging current, wherein the second charging current is less than the first charging current.

A charging method according to an embodiment includes detecting whether two battery modules are balanced, simultaneously charging the two battery modules by a first charging current when the two battery modules are balanced, and executing a specific charging procedure when the two battery modules are not balanced. The step of executing the specific charging procedure includes charging by a first charging current a first battery module that is not balanced between the two battery modules and disconnecting the other between the two battery modules, and simultaneously charging the two battery modules by a second charging current upon the first battery module reaching balance, wherein the second charging current is less than the first charging current.

A charging device according to an embodiment includes a plurality of power contacts, a charging circuit, a switch circuit and a processing circuit. Each of the power contacts is adapted to be coupled to a battery module. The switch circuit is coupled between the charging circuit and the power contacts, and is configured to switch electrical connection between the charging circuits and the power contacts. The processing circuit is coupled to the switch circuit, and is configured to control switching of the switch circuit. When the plurality of power contacts are coupled to a plurality of battery modules, the processing circuit further detects whether the plurality of battery modules are balanced. When the plurality of battery modules are balanced, the processing circuit controls the switch circuit to connect the plurality of power contacts coupled with the plurality of battery modules to the charging circuit, and enables the charging circuit to charge the plurality of battery modules by a first charging current. When the plurality of battery modules are not balanced, the processing circuit executes a specific charging procedure. In the specific charging procedure, the processing circuit controls the switch circuit to connect the power contact coupled with a first battery module lower than a balance voltage, among the plurality of battery modules, to the charging circuit, and controls the charging circuit to charge the first battery module by the first charging current; upon the first battery module reaching balance, the processing circuit controls the switch circuit to connect the plurality of power contacts coupled with the plurality of battery modules having the balance voltage, among the plurality of battery modules, to the charging circuit, and controls the charging circuit to charge the plurality of battery modules having the balance voltage by a second charging current less than the first charging current.

In conclusion of the above, the charging method according to any one of the embodiments is applicable to a charging device, and is capable of decreasing the overall charging time and reducing the amount of temperature rise in the battery modules during the overall charging process, further increasing the cycle life of the battery modules.

DETAILED DESCRIPTION OF THE EMBODIMENTS

Figure 1:
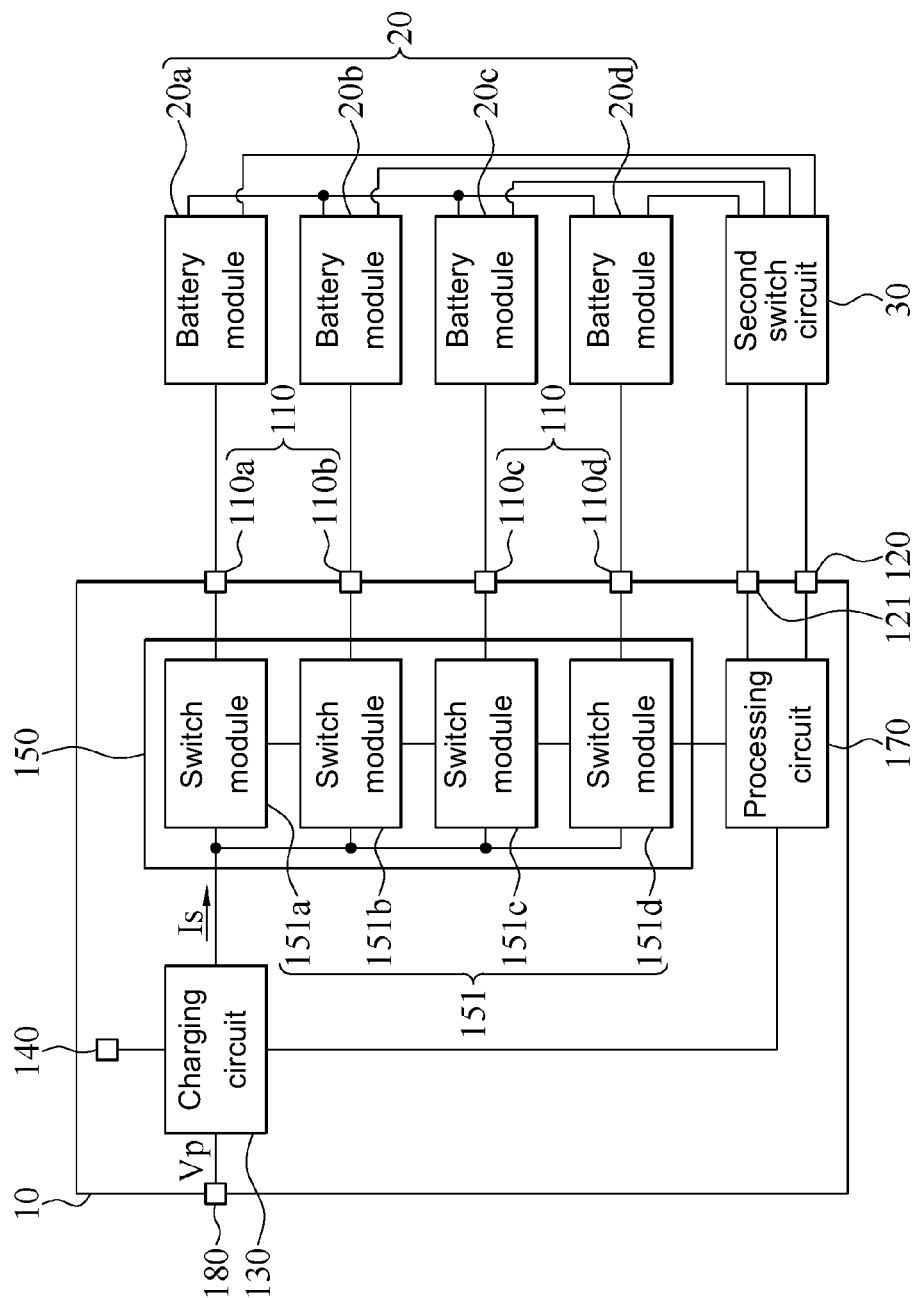
FIG. 1 is a schematic diagram of a first connection state of a charging device according to an embodiment.

Referring to FIG. 1, a charging device 10 includes multiple power contacts 110, a charging circuit 130, a switch circuit 150 (to be referred to as a first switch circuit 150) and a processing circuit 170. The first switch circuit 150 is coupled between the charging circuit 130 and the power contacts 110. The processing circuit 170 is coupled to the first switch circuit 150. The charging circuit 130 and the first switch circuit 150 are individually controlled by the processing circuit 170.

Each of the power contacts 110 is adapted to be coupled to one battery module 20. In other words, each of the power contacts 110 is electrically connected to one battery module 20 outside the charging device 10. In some embodiments, the number of the power contacts 110 is equal to the maximum number of external battery modules 20 that can be connected to the charging device 10. For example, when the charging device 10 has four power contacts 110*a* to 110*d*, the charging device 10 can be connected at most to four external battery modules 20*a* to 20*d*. When the charging device 10 needs to be connected to four external battery modules 20*a* to 20*d*, the power contact 110*a* is coupled to the power module 20*a*, the power contact 110*b* is coupled to the battery module 20*b*, the power contact 110*c* is coupled to the battery module 20*c*, and the power contact 110*d* is coupled to the battery module 20*d*.

The first switch circuit 150 can switch (i.e., establish or disconnect) electrical connection between the individual power contacts 110 and the charging circuit 130 according to control of the processing circuit 170. In other words, when the battery module 20 is coupled to the corresponding power contact 110, the first switch circuit 150 can switch the electrical connection between the power module 20 coupled with the power contact 110 and the charging circuit 130 according to control of the processing circuit 170.

The charging circuit 130 may be coupled to an input contact 180. The input contact 180 may receive an external power supply Vp. For example, assuming that the charging device 10 is applied in an electronic device, the input contact 180 may then receive an external power supply Vp from the outside of the electronic device. For example, the input contact 180 of the electronic device is coupled to an adaptor. At this point, the adaptor converts mains electricity to the external power supply Vp (e.g., an alternating current), and provides the external power supply Vp to the electronic device through the input contact 180.

Herein, the charging circuit 130 may provide a charging current Is to the first switch circuit 150 according to the external power supply Vp, and charge the battery module 20 through the first switch circuit 150 and the power contact 110.

Figure 2:
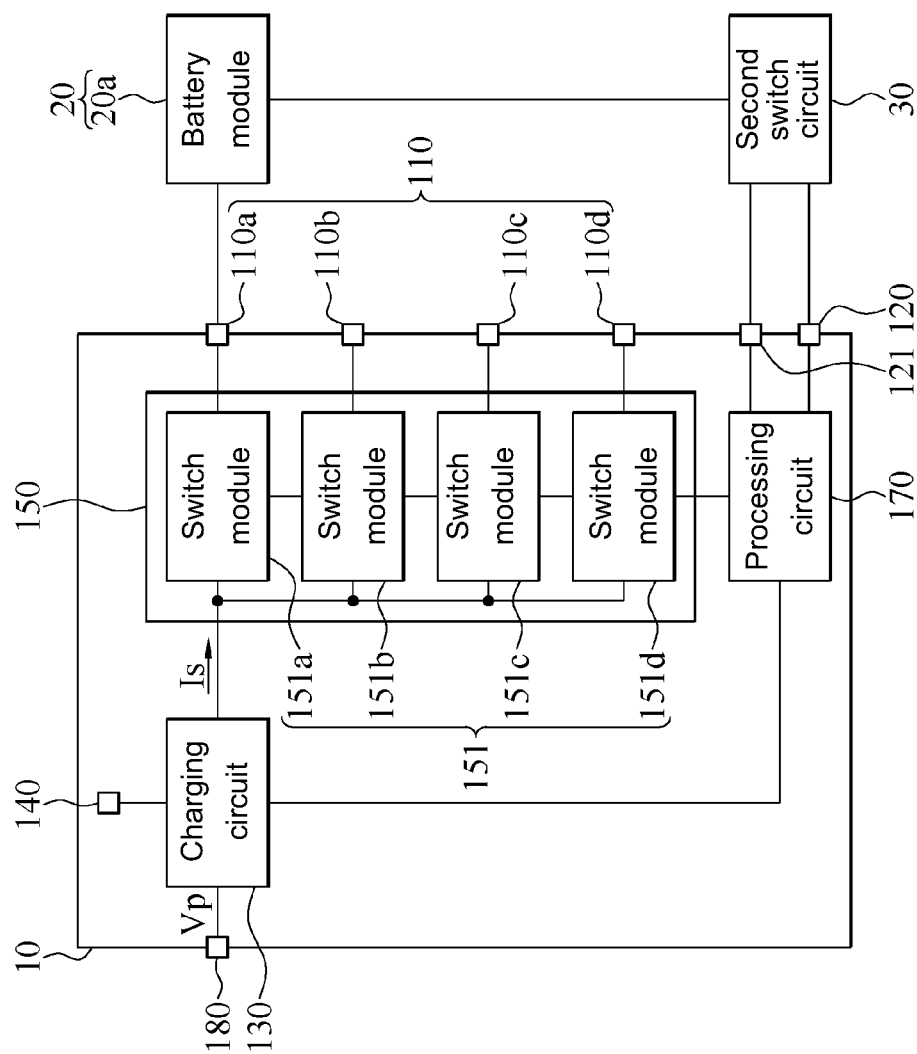
FIG. 2 is a schematic diagram of a second connection state of the charging device in FIG. 1.

Herein, during use of the charging device 10, only one power contact 110 is connected to one external battery module 20 (as shown in FIG. 2), or multiple power contacts 110 are individually connected to respective external battery modules 20 (as shown in FIG. 1).

Figure 3:
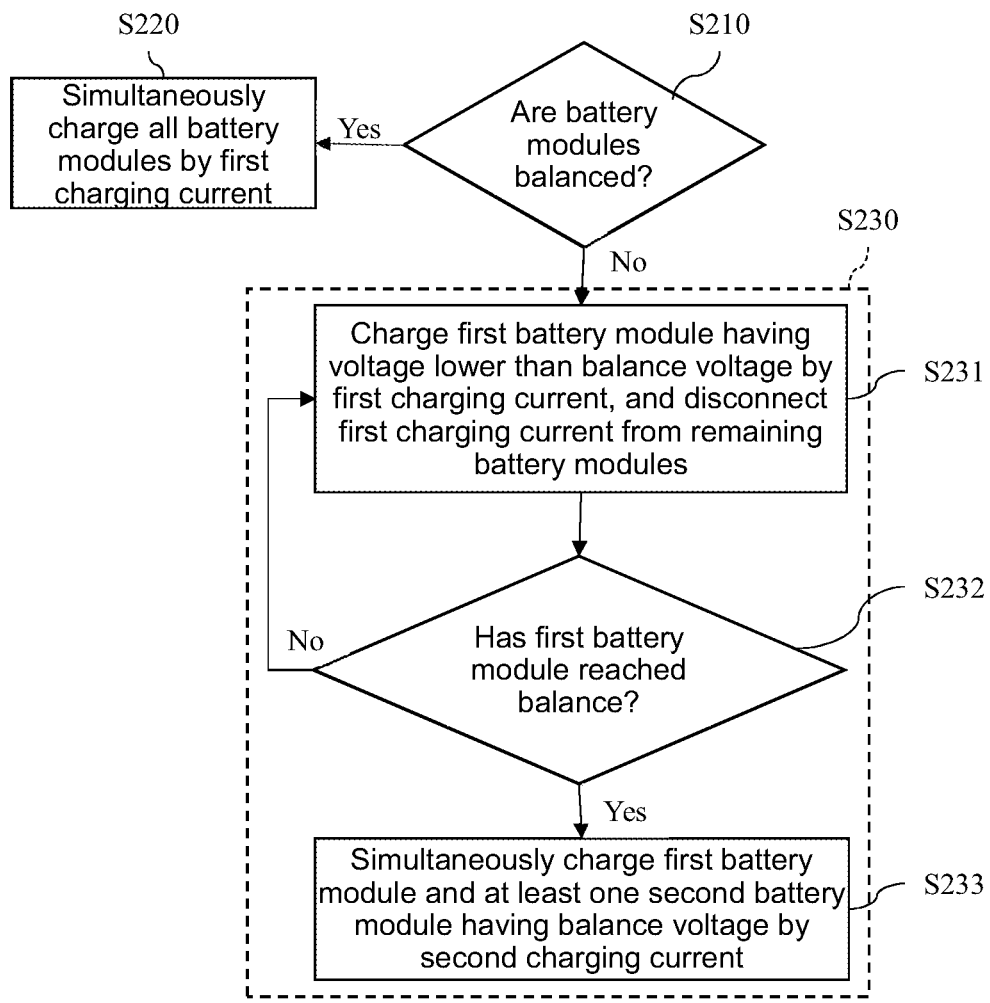
FIG. 3 is a flowchart of a charging method according to an embodiment.

With respect to the charging operation of the battery module 20, referring to FIG. 1 and FIG. 3, when the charging device 10 is connected to multiple external battery modules 20*a* to 20*d*, the processing circuit 170 first detects whether these battery modules 20*a* to 20*d* are balanced (step S210). In some embodiments of step S210, the processing circuit 170 detects voltages of individual battery modules 20, and determines whether the voltages of all the battery modules 20*a* to 20*d* are within a certain error range. When the voltages of all the battery modules 20*a* to 20*d* are within the certain error range, the processing circuit 170 determines that all the battery modules 20*a* to 20*d* are balanced. When the voltage of at least one battery module 20 among all the battery modules 20*a* to 20*d* exceeds the predetermined error range, the processing circuit 170 determines that the battery modules 20*a* to 20*d* are not balanced. In some embodiments, a situation that the voltages of all the battery modules 20*a* to 20*d* are with the certain error range may mean that a difference between two adjacent voltages among the voltages of all the battery modules 20*a* to 20*d* is less than or equal to a first predetermined error value. Conversely, a situation that the voltage of the battery module 20 exceeds the certain error range means that a difference between the voltage of this battery module 20 and the voltage of another battery module 20 having a larger and closest voltage value is more than the first predetermined error value, or a difference between the voltage of this battery module 20 and the voltage of another battery module 20 having a smaller and closest voltage is more than the first predetermined error value. In some embodiments, a situation that the voltages of all the battery modules 20*a* to 20*d* are all within the certain error range means that a difference between the maximum voltage and the minimum voltage among the voltages of all the battery modules 20*a* to 20*d* is less than or equal to the first predetermined error value. Conversely, a situation that the voltage of the battery module 20 exceeds the certain error range means that the voltage of this battery module 20 falls outside a range formed by the maximum voltage among the voltages of all the battery modules 20*a* to 20*d* and a difference between the maximum voltage and the first predetermined error value. The first predetermined error value may be pre-set to any value equal to or more than 0 and less than 1 (Volt) by a designer according to actual requirements.

When the battery modules 20*a* to 20*d* are balanced, the processing circuit 170 controls the first switch circuit 150 to connect the power contacts 110*a* to 110*d* coupled with the battery modules 20*a* to 20*d* to the charging circuit 130, and enables the first charging circuit 130 to simultaneously charge the battery modules 20*a* to 20*d* by a charging current Is (to be referred to as a first charging current Is) in a first value (step S220).

When the battery modules 20*a* to 20*d* are not balanced, the processing circuit 170 performs a specific charging procedure (step S230).

In the specific charging procedure (step S230), the processing circuit 170 controls the first switch circuit 150 to connect the power contact 110 coupled with the battery module 20 (to be referred to as a first battery module 20) lower than a balance voltage, among the battery modules 20*a* to 20*d*, to the charging circuit 130, and controls the charging circuit 130 to charge the first battery module 20 by the first charging current Is (step S231). At this point, the processing circuit 170 controls the first switch circuit 150 to disconnect the remaining battery modules 20 among the battery modules 20*a* to 20*d* from the charging circuit 130, that is, disconnecting the first charging current Is from the remaining battery modules 20 (step S231). In some embodiments of step S231, the processing circuit 170 records the voltage of the battery module 20 having the second lowest voltage among the battery modules 20a to 20d obtained in step S210 as the balance voltage and an identity signal of the battery module 20 (to be referred to as a second battery module 20) having the second lowest voltage, and controls the charging circuit 130 to provide the first charging current Is to the first switch circuit 150. Then, the processing circuit 170 controls the first switch circuit 150 to connect the electrical connection between the charging circuit 130 and the first battery module 20, and disconnects electrical connection between each of the remaining battery modules 20 and the charging circuit 130, such that the first charging current Is charges through the first battery module 20. Herein, the first battery module 20 is the battery module 20 having the lowest voltage (i.e., the lowest among the voltages of the battery modules 20a to 20d obtained in step S210) among the battery modules 20. In some embodiments, the first battery module 20 lower than the balance voltage may mean that the voltage of the first battery module 20 is less than the balance voltage and a difference thereof from the balance voltage is more than a second predetermined error value. The second predetermined error value is less than the balance voltage, and may be equal to the first predetermined error value or not equal to the first predetermined error value. The second predetermined error value may be pre-set to any value equal to or more than 0 and less than 1 (Volt) by a designer according to actual requirements.

While the charging device 10 charges the first battery module 20 by the first charging current Is, the processing circuit 170 monitors the voltage of the first battery module 20 to determine whether the first battery module 20 has reached a balance voltage (step S232). Upon the first battery module 20 reaching the balance voltage, the processing circuit 170 controls the first switch circuit 150 to connect the plurality of power contacts 110 coupled with the first battery module 20 and the at least one battery module 20 (to be referred to as a second battery module 20) having the balance voltage among the plurality of battery modules 20a to 20d to the charging circuit 130, and controls the charging circuit 130 to simultaneously charge the first battery module 20 and the second battery module 20 by the charging current Is in a second value (to be referred to as a second charging current Is). The second charging current Is is less than the first charging current Is, i.e., the second value is less than the first value, and the first value and the second value are both any values more than 0. In some embodiments, a situation that the first battery module 20 has reached the balance voltage means that a difference between the first battery module 20 and the balance voltage is less than or equal to the second predetermined error value. In other words, the voltage of the first battery module 20 is between the difference of the balance voltage from the second predetermined error value and a sum of the balance voltage and the second predetermined error value. The battery module 20 having the balance voltage refers to the battery module 20 having a voltage between the difference of the balance voltage from the second predetermined error value and the sum of the balance voltage and the second predetermined error value.

In other words, the charging circuit 130 switches from providing the first charging current Is to providing the second charging current Is to the first switch circuit 150, that is, the charging circuit 130 reduces the charging current Is from the first value to the second value. In some embodiments of step S233, upon the voltage of the first battery module 20 reaching the balance voltage recorded in step S231, the processing circuit 170 controls the charging circuit 130 to switch to providing the second charging current Is to the first switch circuit 150. Then, the processing circuit 170 controls the first switch circuit 150 according to the identity signal recorded in step S231 to further connect the electrical connection between the charging circuit 130 and the second battery module 20. At this point, the first switch circuit 150 maintains the connection of the electrical connection between the charging circuit 130 and the first battery module 20, and maintains the disconnected electrical connection between each of the remaining battery modules 20 (i.e., the battery modules 20 apart from the first battery module 20 and the second battery module 20) and the charging circuit 130. Thus, the second charging current Is is outputted to the first battery module 20 and the second battery module 20 through the first switch circuit 150.

In some embodiments, a reduction rate of the second charging current Is to the first charging current Is may be determined according to tolerances of all the battery modules 20 currently coupled with the charging device 10. In some embodiments, the second charging current Is may be determined according to the tolerance of the battery module 20 having the smallest capacity among all the battery modules 20 currently coupled with the charging device 10. For example, assuming that the charging device 10 is currently coupled with two battery modules 20 that have the same total capacity, the second charging current Is at this point may be 50% of the first charging current Is.

For example, assume that the charging circuit 130 is connected to four external battery modules 20a to 20d, and an initial state of the first switch circuit 150 is disconnecting the charging circuit 130 from all the power contacts 110a to 110d. Further, assume that among the voltages of the battery modules 20a to 20d obtained in step S210, the voltage of the battery module 20b is more than the voltage of the battery module 20d, the voltage of the battery module 20d is more than the voltage of the battery module 20c, and the voltage of the battery module 20c is more than the voltage of the battery module 20a. That is, the voltage of the battery module 20c is the balance voltage, the first battery module 20 (i.e., the battery module 20 lower than the balance voltage) is the battery module 20a, and the second battery module 20 is the battery module 20c.

In this example, the processing circuit 170 first controls the charging circuit 130 to provide the first charging current Is to the first switch circuit 150. The processing circuit 170 further controls the first switch circuit 150 to connect the electrical connection between the charging circuit 130 and the power contact 110a, and to disconnect the electrical connection between the charging circuit 130 and each of the power contacts 110b to 110d, so that the first charging current Is is outputted to the battery module 20a but not outputted to the remaining battery modules 20b to 20d. Upon the current voltage of the battery 20a reaching the balance voltage, the processing circuit 170 controls the charging circuit 130 to switch to providing the second charging current Is to the first switch circuit 150. The processing circuit 170 further controls the first switch circuit 150 to switch to connecting the electrical connection between the charging circuit 130 and each of the two power contacts 110a and 110c and disconnecting the electrical connection between the charging circuit 130 and each of the two power contacts 110b and 110d, so that the second charging current Is is outputted to the battery modules 20a and 20c but not outputted to the battery modules 20b and 20d.

Figure 4:
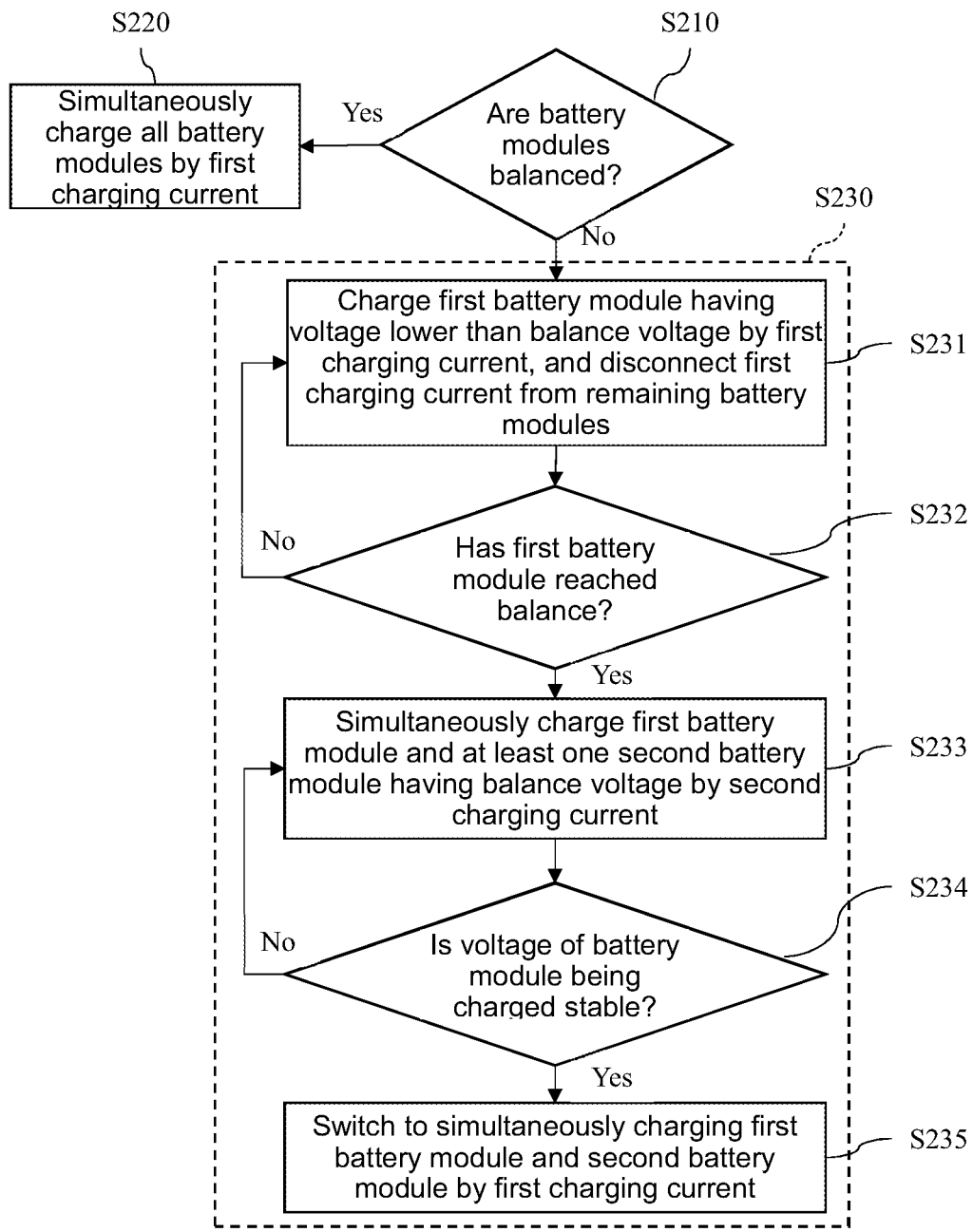
FIG. 4 is a flowchart of a charging method according to another embodiment.

In some embodiments, referring to FIG. 1 and FIG. 4, when the charging device 10 is coupled with the multiple battery modules 20a to 20d, the charging current Is can be reduced only within a short period while the first switch circuit 150 performs switching of the connection state. That is to say, in a period in which the charging device 10 simultaneously charges the first battery module 20 and the second battery module 20 by the second charging current Is, the processing circuit 170 first determines whether the voltage of the first battery module 20 (or the battery module 20 being charged) (step S234) is stable. When the voltage of the first battery module 20 (or the battery module 20 being charged) is stable, the processing circuit 170 controls the charging circuit 130 to switch from providing the second charging current Is to providing the first charging current Is to the first switch circuit 150, so that the first charging current Is simultaneously charges the first battery module 20 and the second battery module 20 (step S235). That is, the first switch circuit 150 is kept in a switching state, with however the charging circuit 130 increasing the charging current Is to the first charging current Is.

In some embodiments, upon the first battery module 20 reaching the balance voltage, the charging circuit 130 switches from providing the first charging current Is to providing the second charging current Is to the first switch circuit 150. The first switch circuit 150 is connected in parallel to the first battery module 20 and the second battery module 20 having the balance voltage so as to form a parallel battery structure, and outputs the second charging current Is to the parallel battery structure, so that the second charging current Is charges the parallel battery structure (step S233). In other words, the first battery module 20 and the second battery module 20 form a parallel battery structure via the first switch circuit 150. Moreover, when the voltage of the parallel battery structure is stable, the processing circuit 170 controls the charging circuit 130 to switch to simultaneously charging the parallel battery structure by the first charging current Is (step S233). For example, in continuation of the example above, in a period in which the second charging current Is charges the battery modules 20a and 20c, the processing circuit 170 determines whether the voltage of the battery module 20a (and the battery module 20c) is stable. When the voltage of the battery module 20a (and the battery module 20c) is stable, the processing circuit 170 controls the charging circuit 130 to switch to simultaneously charging the battery module 20a and the battery module 20c by the first charging current Is.

In some embodiments of step S234, the processing circuit 170 may determine whether the voltage of the battery module 20 is stable by means of activating a timer and timing a specific timing using the timer. For example, at the instant that the processing circuit 170 controls the charging circuit 130 to switch to providing the second charging current Is or controls the first switch circuit 150 to switch and connect in parallel to the first battery module 20 and the second battery module 20, the processing circuit 170 may further enable the timer to start timing. Upon the timer reaching the specific timing, the timer notifies the processing circuit 170, so that the processing circuit 170 accordingly determines the voltage stability of the battery module 20 being charged.

In some embodiments of step S234, the processing circuit 170 may determine whether the voltage of the battery module 20 being charged is stable by means of monitoring the voltage of the first battery module 20 and determining whether the voltage of the first battery module 20 has returned to a predetermined voltage. When the voltage of the first battery module 20 has returned to the predetermined voltage, the processing circuit 170 determines that the voltage of the battery module 20 being charged is stable. In one embodiment, the predetermined voltage may be a highest voltage before the voltage of the first battery module 20 drops due to the reduce in the charging current Is. In one example, a situation that the voltage of the first battery module 20 has returned to the highest voltage means that a value of the voltage of the first battery module 20 is equal to the highest voltage. Conversely, a situation that the voltage of the first battery module 20 has not returned to the highest voltage means that the value of the voltage of the first battery module 20 is less than the highest voltage. In another example, a situation that the voltage of the first battery module 20 has returned to the highest voltage means that a difference between the value of the voltage of the first battery module 20 and the highest voltage is less than or equal to a third predetermined error value. Conversely, a situation that the voltage of the first battery module 20 has not returned to the highest voltage means that the difference between the value of the voltage of the first battery module 20 and the highest voltage is more than the third predetermined error value. The third predetermined error value is less than the highest voltage, and may be equal to the first predetermined error value or not equal to the first predetermined error value. Further, the third predetermined error value may be equal to the second predetermined error value or not equal to the second predetermined error value. The third predetermined error value may be pre-set to any value more than 0 and less than 1 (Volt) by a designer according to actual requirements. In another embodiment, the predetermined voltage may be the balance voltage or be associated with the balance voltage (e.g., a specific ratio of the balance voltage). For example, when the processing circuit 170 controls the charging circuit 130 to switch to providing the second charging current Is, the voltage of the first battery module 20 instantly drops, but subsequently continues to rise as being continuously charged by the second charging current Is. In a period of charging by the second charging current Is, the processing circuit 170 monitors the voltage of the first battery module 20 and determines whether the voltage of the first battery module 20 has returned to the balance voltage. When the voltage of the first battery module 20 has returned to the balance voltage, the processing circuit 170 controls the charging circuit 130 to switch to providing the first charging current Is to simultaneously charge the first battery module 20 and the second battery module 20. In one example, a situation that the voltage of the first battery module 20 has returned to the balance voltage may mean that the value of the voltage of the first battery module 20 is equal to the balance voltage. Conversely, a situation that the voltage of the first battery module 20 has not returned to the balance voltage may mean that the value of the voltage of the first battery module 20 is less than the balance voltage. In another example, a situation that the voltage of the first battery module 20 has returned to the balance voltage may mean that a difference between the value of the voltage of the first battery module 20 and the balance voltage is less than or equal to a fourth predetermined error value. Conversely a situation that the voltage of the first battery module 20 has not returned to the balance voltage may mean that the difference between the value of the voltage of the first battery module 20 and the balance voltage is more a fourth predetermined error value. The fourth predetermined error value is less than the balance voltage, and may be equal to the first predetermined error value or not equal to the first predetermined error value. Further, the fourth predetermined error value may be equal to the second predetermined error value or not equal to the second predetermined error value.

The fourth predetermined error value may be pre-set to any value more than 0 and less than 1 (Volt) by a designer according to actual requirements.

In some embodiments of step S234, the processing circuit 170 may determine, by means of monitoring the voltage of the first battery module 20 and the voltage of the second battery module 20 and determining whether the voltage of the first battery module 20 matches the voltage of the second battery module 20, whether the voltage of the battery module 20 being charged is stable. In one example, a situation that the voltage of the first battery module 20 matches the voltage of the second battery module 20 means that the voltage of the first battery module 20 is equal to the voltage of the second battery module 20. Conversely, a situation that the voltage of the first battery module 20 does not match the voltage of the second battery module 20 means that the voltage of the first battery module 20 is less than the voltage of the second battery module 20. In another example, a situation that the voltage of the first battery module 20 matches the voltage of the second battery module 20 means that a difference between the voltage of the first battery module 20 and the voltage of the second battery module 20 is less than or equal to a fifth predetermined error value. Conversely, a situation that the voltage of the first battery module 20 does not match the voltage of the second battery module 20 means that the difference between the voltage of the first battery module 20 and the voltage of the second battery module 20 is more than the fifth predetermined error value. The fifth predetermined error value is less than the balance voltage, and may be equal to the first predetermined error value or not equal to the first predetermined error value. Further, the fifth predetermined error value may be equal to the second predetermined error value or not equal to the second predetermined error value. The fifth predetermined error value may be pre-set to any value more than 0 and less than 1 (Volt) by a designer according to actual requirements.

In some embodiments, the processing circuit 170 may determine, by means of monitoring the voltage of the parallel battery structure and determining whether the voltage of the parallel battery structure has reached a predetermined voltage, whether the voltage of the battery module 20 is stable. Upon the voltage of the parallel battery structure reaching the predetermined voltage, the processing circuit 170 determines that the voltage of the battery module 20 being charged is stabled. Conversely, when the voltage of the parallel battery structure has not yet reached the predetermined voltage, the processing circuit 170 determines that the voltage of the battery module 20 is not stable. In one example, a situation that the voltage of the parallel battery structure has reached the predetermined voltage means that a terminal voltage of the parallel connection contact of the parallel battery structure is equal to the predetermined voltage. Conversely, a situation that the voltage of the parallel battery structure has not reached the predetermined voltage means that the terminal voltage of the parallel connection contact of the parallel battery structure is less than the predetermined voltage. In another example, a situation that the voltage of the parallel battery structure has reached the predetermined voltage means that a difference between the terminal voltage of the parallel connection contact of the parallel battery structure and the predetermined voltage is less than or equal to a sixth predetermined error value. Conversely, a situation that the voltage of the parallel battery structure has not reached the predetermined voltage means that the difference between the terminal voltage of the parallel connection contact of the parallel battery structure and the predetermined voltage is more than the sixth predetermined error value. The sixth predetermined error value is less than the balance voltage, and may be equal to the first predetermined error value or not equal to the predetermined error value. Further, the sixth predetermined error value may be equal to the second predetermined error value or not equal to the second predetermined error value. The sixth predetermined error value may be pre-set to any value more than 0 and less than 1 (Volt) by a designer according to actual requirements. For example, in a period of charging by the second charging current Is, the processing circuit 170 captures the voltage on one side (i.e., the parallel connection contact) of the first switch circuit 150 coupled with the charging circuit 130 and determines whether the captured voltage has reached the predetermined voltage. When the captured voltage has reached the predetermined voltage, the processing circuit 170 controls the charging circuit 130 to switch to charging the parallel battery structure by the first charging current Is. In some embodiments, the predetermined voltage may be the balance voltage or be associated with the balance voltage (e.g., a specific ratio of the balance voltage).

Figure 5:
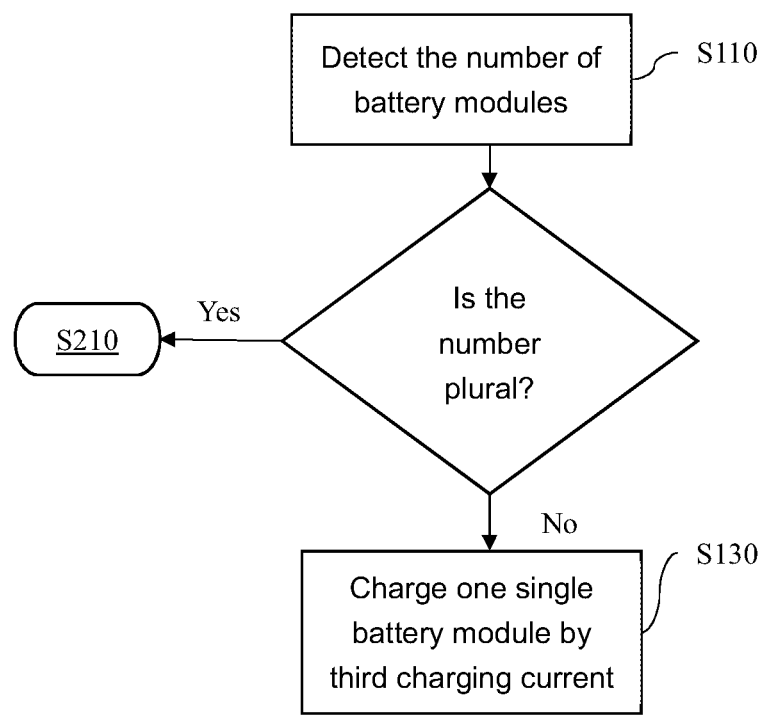
FIG. 5 is a flowchart of a charging method according to yet some other embodiments.

In some embodiments, referring to FIG. 1 and FIG. 5, when the charging device 10 starts executing the charging procedure of the battery module 20, the processing circuit 170 first detects the number of the battery modules 20 (i.e., detecting the number of the battery modules 20 currently coupled to the charging device 10) of the system (step S110). Referring to FIG. 1, FIG. 4 and FIG. 5, only upon detecting that the number of the battery modules 20 is multiple, the processing circuit 170 performs step S210. Referring to FIG. 2 and FIG. 5, upon detecting that the number of the battery modules 20 is one (which is assumed to be the battery module 20a), the processing circuit 170 controls the charging circuit 130 to provide the charging current Is in a third value (to be referred to as a third charging current Is) to the first switch circuit 150, and controls the first switch circuit 150 to connect the charging circuit 130 to the power contact 110a coupled with the single battery module 20a, so that the third charging current Is charges the single battery module 20a (step S130). In one embodiment, the third charging current Is may be equal to the first charging current Is, i.e., the first value is equal to the third value. In another embodiment, the third charging current Is may be not equal to the first charging current Is, i.e., the first value is not equal to the third value. Further, the third value is any value more than 0.

In some embodiments, the voltage of the battery module 20 in steps S210, S232 and S234 may be the terminal voltage at an output terminal (e.g., the terminal voltage of the power contact 110 corresponding to the battery module 20) of the battery module 20, or be an open-circuit voltage (OCV) of the battery module 20.

Figure 6:
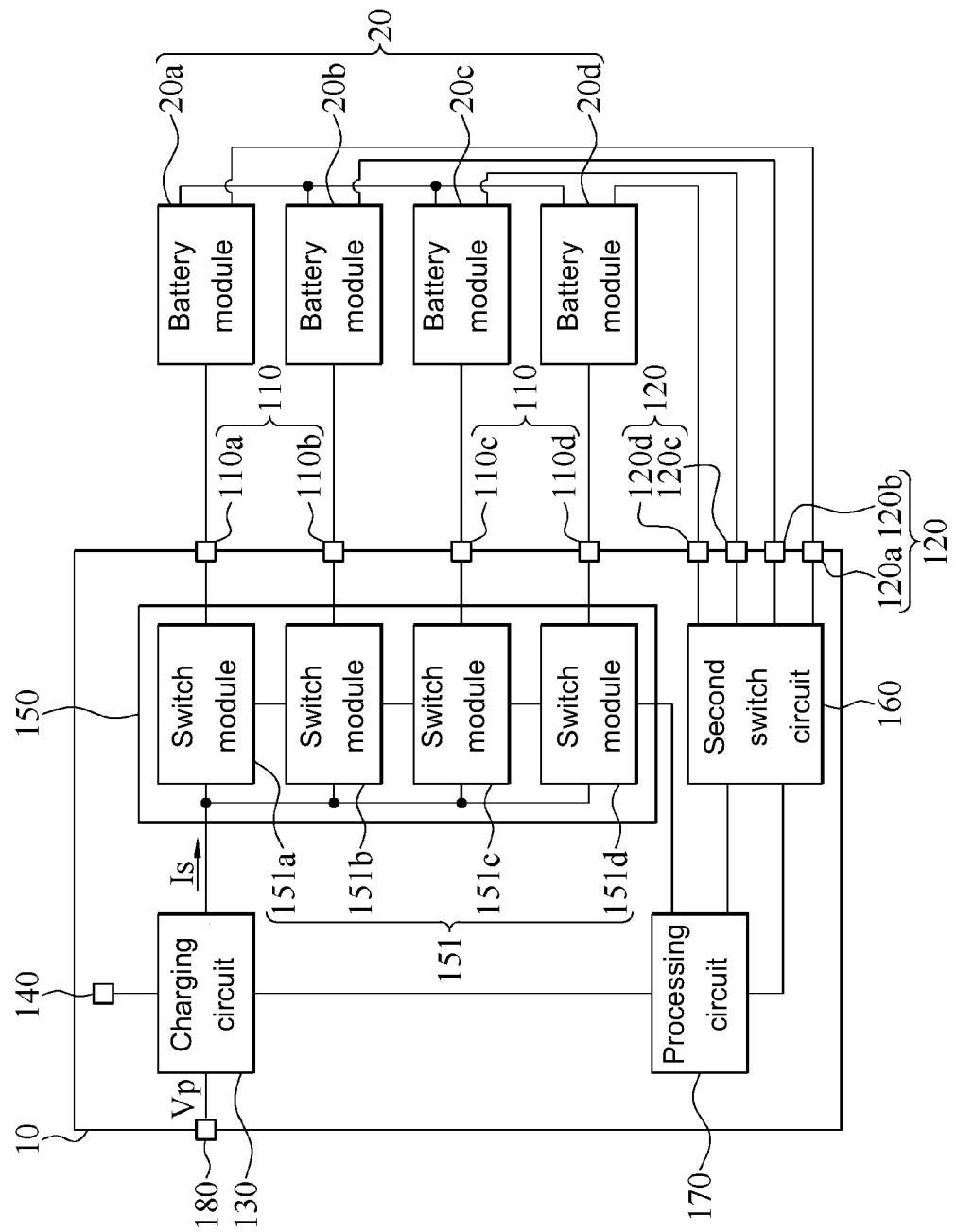
FIG. 6 is a schematic diagram of a first connection state of a charging device according to another embodiment.

In some embodiments, referring to FIG. 1, FIG. 2 and FIG. 6, the charging device 10 may further include at least one signal contact 120. The processing circuit 170 is coupled to each signal contact 120. When the battery module 20 is mounted on the charging device 10, the battery modules 20 are further coupled to the signal contact 120 in addition to being coupled to the corresponding power contacts 110. When the battery modules 20 are coupled to the corresponding power contacts 110, the charging circuit 130 may charge the battery modules 20 coupled to the corresponding power contacts 110, and the processing circuit 170 may read battery information (e.g., the OCV) of the individual battery modules 20 through the signal contact 120.

In some embodiments, the charging device 10 may switch by at least one switch circuit (30 or 160) (to be referred to as a second switch circuit (30 or 160)) the battery module 20 read by the processing circuit 170.

In some embodiments, referring to FIG. 1 and FIG. 2, the second switch circuit 30 is outside the charging device 10. The charging device 10 may have multiple signal contacts 120 and 121. The processing circuit 170 is coupled to the signal contacts 120 and 121.

Herein, the processing circuit 170 is coupled to a first terminal of the second switch circuit 30 through at least one (to be referred to as a first signal contact 120) between the signal contacts 120 and 121, and multiple second terminals of the second switch circuit 30 are respectively coupled to the multiple battery modules 20. In other words, each second signal contact 120 is coupled through the second switch circuit 30 to all the external battery modules 20 connected to the charging device 10. The processing circuit 170 is coupled through at least another (to be referred to as a second signal contact 121) between the signal contacts 120 and 121 to a control terminal of the second switch circuit 30, and determines by means of controlling switching of the second switch circuit 30 through the first signal contact 121 whether to connect the first terminal of the second switch circuit 30 to the individual second terminals of the second switch circuit 30.

In some embodiments, referring to FIG. 6, the second switch circuit 160 is inside the charging device 10. The charging device 10 may have multiple signal contacts 120, each of which for coupling to one battery module 20. In some embodiments, the number of the signal contacts 120 is equal to the maximum number of the external battery modules 20 that can be connected to the charging device 10. For example, when the charging device 10 has four signal contacts 120a to 120d, the charging device 10 can be connected at most to four external battery modules 20a to 20d. When the charging device 10 needs to be connected to four external battery modules 20a to 20d, the battery module 20a is further coupled to the signal contact 120a in addition to being coupled to the power contact 110a, the battery module 20b is further coupled to the signal contact 120b in addition to being coupled to the power contact 110b, the battery module 20c is further coupled to the signal contact 120c in addition to being coupled to the power contact 110c, and the battery module 20d is further coupled to the signal contact 120d in addition to being coupled to the power contact 110d.

Herein, the processing circuit 170 is coupled to the first terminal of the second switch circuit 160, and the multiple second terminals of the second switch circuit 160 are respectively coupled to the multiple signal contacts 120a to 120d. The processing circuit 170 is further coupled to the control terminal of the second switch circuit 160, and controls switching of the second switch circuit 160 to determine whether to connect the electrical connection between the first terminal of the second switch circuit 160 and each of the second terminals of the second switch circuit 160. In other words, the processing circuit 170 can be coupled to the corresponding battery modules 20a to 20d through the second switch circuit 160 and the individual second signal contacts 120a to 120d.

Referring to FIG. 1 and FIG. 3, or referring to FIG. 3 and FIG. 6, in some embodiments of step S210, the processing circuit 170 controls the second switch circuit (30 or 160) to switch sequentially, and to sequentially read one after another the OCV of one or more battery modules 20 through the second signal contact 120 and the second switch circuit (30 or 160). After obtaining the OCVs of all the coupled battery modules 20, the processing circuit 170 determines whether the OCVs of all the coupled battery modules 20 are within a certain error range. When the OCVs of the battery modules 20 are within the certain error range, the processing circuit 170 determines that these battery modules 20 are balanced. When the OCV of any one of the battery modules 20 exceeds the certain error range, the processing circuit 170 determines that these battery modules 20 are not balanced. At this point, among the multiple unbalanced battery modules 20, the one having the lowest OCV is the first battery module 20. Among the multiple unbalanced battery modules 20, the OCV of the second battery module 20 is higher than and second only to the OCV of the first battery module 20. The balance voltage is the OCV of the second battery module 20.

In some embodiments of step S232, the processing circuit 170 may control the second switch circuit (30 or 160) to connect to the first battery module 20 to sequentially read one after another the OCV of the first battery module 20 through the second signal contact 120 and the second switch circuit (30 or 160), further determining whether the OCV of the first battery module 20 being charged by the first charging current Is has reached the balance voltage.

In some embodiments of step S234, the processing circuit 170 may control the second switch circuit (30 or 160) to connect to the first battery module 20 to read one after another the OCV of the first battery module 20 through the second signal contact 120 and the second switch circuit (30 or 160), further determining whether the OCV of the first battery module 20 (and the second battery module 20) has returned to the predetermined voltage so as to determine whether the voltage of the battery module 20 is stable.

In some embodiments, referring to FIG. 1, FIG. 2 and FIG. 6, the charging circuit 130 may be further coupled to a system contact 140. The system contact 140 is configured to couple to a system circuit. The charging circuit 130 may power the system circuit through the system contact 140 according to the external power source Vp or the power stored in the battery module 20. For example, assuming that the charging device 10 is applied in an electronic device, the system contact 140 is coupled to the system circuit of the electronic device. The charging circuit 130 may then provide through the system contact 140 the power for operating the electronic device from the external power source Vp or the power stored in the battery module 20.

Figure 7:
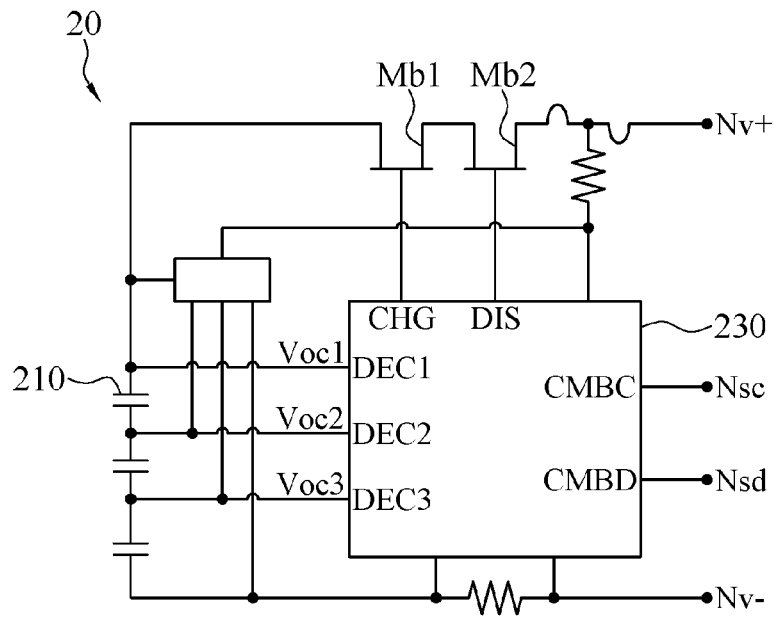
FIG. 7 is a circuit schematic diagram of a battery module according to an embodiment.

In some embodiments, referring to FIG. 7, each battery module 20 may include one or more battery cells 210 and a gauge integrated circuit (IC) 230. Each battery module 20 has a positive contact Nv+, a negative contact Nv−, and signal contacts Nsc and Nsd.

The battery cell 210 is coupled between the positive contact Nv+ and the negative contact Nv−. In some embodiments, when the battery module 20 has multiple battery cells 210, the multiple battery cells 210 are connected in series between the positive contact Nv+ and the negative contact Nv−.

Detection pins DEC1, DEC1 and DEC3 of the gauge IC 230 are coupled to positive terminals of the individual battery cells 210. Herein, the gauge IC 230 detects terminal voltages Voc1, Voc2 and Voc3 of the battery cells 210 by means of detecting the pins DEC1, DEC2 and DEC3, and calculates the OCV of the battery module 20 according to the detected terminal voltages Voc1, Voc2 and Voc3.

Control pins CHG and DIS of the gauge IC 230 are coupled to control terminals of path switches Mb1 and Mb2 between the battery cell 210 and the positive contact Nv+.

Herein, the gauge IC 230 can control whether to turn on the path switches Mb1 and Mb2 by the control pins CHG and DIS, so that the battery cell 210 outputs power through the positive contact Nv+ or the battery cell 210 receives and is charged by the power through the positive contact Nv+.

Signal pins CMBC and CMBD of the gauge IC 230 are coupled to the signal contacts Nsc and Nsd. The signal contacts Nsc and Nsd are externally coupled to the signal contact 120 of the charging device 10. In other words, for each battery module 20, the signal pins CMBC and CMBD of the gauge IC 230 are coupled to the processing circuit 170 through the signal contacts Nsc and Nsd, the second switch circuit (30 or 160) and the signal contact 120. Herein, the gauge IC 230 outputs a control clock to the processing circuit 170 through the signal pin CMBC, the signal contact Nsc, the second switch circuit (30 or 160) and the signal contact 120. The gauge IC 230 transmits data to the processing circuit 170 through the signal pin CMBD, the signal contact Nsd, the second switch circuit (30 or 160) and the signal contact 120. In other words, the processing circuit 170 can receive the control signal and the battery information (i.e., data) transmitted from the gauge IC 230 of any one battery module 20, so that the processing circuit 170 reads the corresponding battery information according to the control clock.

The positive contact Nv+ is externally coupled to the power contact 110 of the charging device 10, so that the power can be transmitted between the power module 20 and the charging device 10.

In some embodiments, the first switch circuit 150 may include multiple switch modules 151. The switch modules 151 correspond in a one-on-one manner to the power contacts 110. That is, the number of the switch modules 151 corresponds to the number of the power contacts 110. The individual switch modules 151 are coupled between the charging circuit 130 and the corresponding power contacts 110. Herein, the switch modules 151 are individually controlled by the processing circuit 170, and are configured to determine whether to connect the electrical connection between the charging circuit 130 and the corresponding power contacts 110.

For example, assume that the charging circuit 130 can be connected at most to four external battery modules 20a to 20d. At this point, the charging circuit 130 has four power contacts 110a to 110d, and the first switch circuit 150 may include four switch modules 151a to 151d. The switch module 151a is coupled between the charging circuit 130 and the power contact 110a, and is configured to determine whether to connect the electrical connection between the charging circuit 130 and the power contact 110a. The switch module 151b is coupled between the charging circuit 130 and the power contact 110b, and is to determine whether to connect the electrical connection between the charging circuit 130 and the power contact 110b. The switch module 151c is coupled between the charging circuit 130 and the power contact 110c, and is to determine whether to connect the electrical connection between the charging circuit 130 and the power contact 110c. The switch module 151d is coupled between the charging circuit 130 and the power contact 110d, and is to determine whether to connect the electrical connection between the charging circuit 130 and the power contact 110d.

Figure 8:
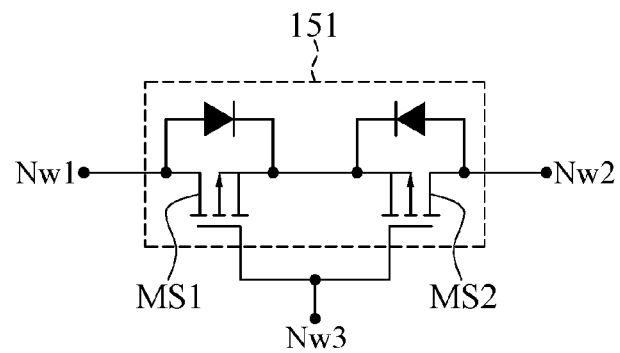
FIG. 8 is a circuit schematic diagram of a switch module according to an embodiment.

Herein, each switch module 151 is formed by one or more switches Ms1 and Ms2, as shown in FIG. 8. In some embodiments, referring to FIG. 8, when each switch module 151 is formed by multiple switches Ms1 and Ms2, these switches Ms1 and Ms2 are connected in series between the charging circuit 130 and the corresponding power contact 110. For example, assume that each switch module 151 is formed by two switches Ms1 and Ms2, the two switches Ms1 and Ms2 are connected in series between a first contact Nw1 and a second contact Nw2. The first contact Nw1 is coupled to the charging circuit 130, and the second contact Nw2 is coupled to the corresponding power contact 110. Control terminals of the two switches Ms1 and Ms2 are coupled to a control contact Nw3, and the control contact Nw3 is coupled to the processing circuit 170, so that the processing circuit 170 may control whether to turn on the two switches Ms1 and Ms2. In one example, in any one switch module 151, each of the switches Ms1 and Ms2 may be a transistor. For example, in continuation of the above example, assume that each of the switches Ms1 and Ms2 is a transistor, the two transistors may be mutually connected in opposite; that is, the source of one transistor (i.e., the switch Ms1) is coupled to the source of the another transistor (i.e., the switch Ms2), and the drains of the two transistors are respectively coupled to the charging circuit 130 and corresponding the power contact 110. Thus, when the switch module 151 is turned off, current does not flow through the parasitic diode of the two transistors and does not flow in reverse.

Figure 9:
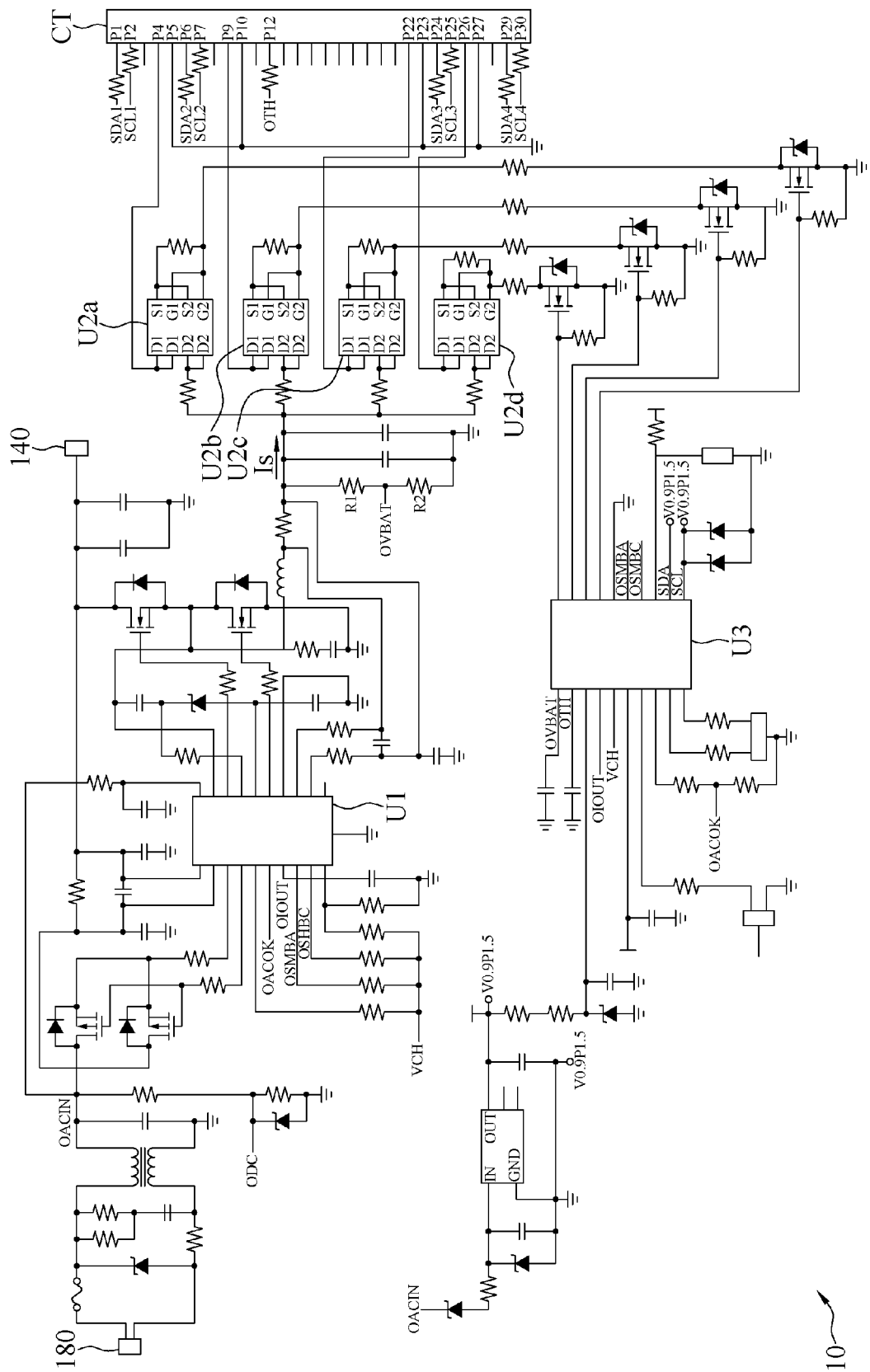
FIG. 9 is a circuit schematic diagram of an example of the charging device in FIG. 6.

In some embodiments, referring to FIG. 9, the individual switch modules 151 may be implemented by switch chips U2a to U2d. An internal circuit of each of the switch chips U2d to U2d includes two transistors. Pins D1 and D2 of the switch chips U2d to U2d are respectively coupled to the drains of the two transistors, pins S1 and S2 of the switch chips U2a to U2d are respectively coupled to the sources of the two transistors, and pins G1 and G2 of the switch chips U2a to U2d are respectively coupled to the gates of the two transistors.

Referring to FIG. 9, the charging circuit 130 may be implemented by one single control chip U1. For example, the charging circuit 130 may include one single control chip U1 and an application circuit of the control chip U1. Further, the charging circuit 130 may be coupled to the processing circuit 170 through contacts OACIN, OACOK, OIOUT, OSMBA, OSMBC, VCH and ODC.

Referring to FIG. 9, the processing circuit 170 may be implemented by a processing chip U3. The processing chip U3 may be built in with a processor (e.g., a central processor) and a memory (e.g., flash or SRAM). For example, the processing circuit 170 may include the processing chip U3 and an application circuit of the processing chip U3.

The processing circuit 170 is coupled to the second switch circuit 160 through contacts SDA and SCL. The second switch circuit 160 is coupled to the signal contacts 120 through contacts SDA1, SCL1, SDA2, SCL2, SDA3, SCL3, SDA4 and SCL4. For example, referring to FIG. 6, FIG. 7 and FIG. 9, assume that the charging circuit 130 may be connected at most to four battery modules 20a to 20d. The processing chip U3 of the processing circuit 170 is coupled to the contacts SDA1, SDA2, SDA3 and SDA4 through the contact SDA and the second switch circuit 160, and the contacts SDA1, SDA2, SDA3 and SDA4 are respectively coupled to the signal contacts Nsd of the battery modules 20a and 20b through a set of signal contacts 120a to 120d. The processing chip U3 of the processing circuit 170 is coupled to the contacts SCL1, SCL2, SCL3 and SCL4 through the contact SCL and another second switch circuit 160, and the contacts SCL1, SCL2, SCL3 and SCL4 are respectively coupled to the signal contacts Nsc of the battery modules 20a and 20b through another set of signal contacts 120a to 120d.

In some embodiments, the power contact 110 and the signal contact 120 of the charging device 10 may be implemented by one or more connectors CT. For example, assume that the charging circuit 130 may be connected at most to four battery modules 20a to 20d. The power contacts 110a to 110d may be contact terminals P4, P9, P22 and P26 of the connector CT. The contact terminal P4 of the connector CT is internally coupled to the pin D1 of the switch chip U2a, and is externally coupled to the positive contact Nv+ of the battery module 20a. The contact terminal P9 of the connector CT is internally coupled to the pin D1 of the switch chip U2b, and is externally coupled to the positive contact Nv+ of the battery module 20b. The contact terminal P22 of the connector CT is internally coupled to the pin D1 of the switch chip U2c, and is externally coupled to the positive contact Nv+ of the battery module 20c. The contact terminal P26 of the connector CT is internally coupled to the pin D1 of the switch chip U2d, and is externally coupled to the positive contact Nv+ of the battery module 20d. Herein, the negative contacts Nv− of the battery modules 20a to 20d are respectively coupled to contact terminals P5, P10, P23 and P27 of the connector CT, and are coupled to ground through the contact terminals P5, P10, P23 and P27. The signal contacts 120 are contact terminals P1, P2, P6, P7, P24, P25, P29 and P30 of the connector CT. The contact terminals P1, P2, P6, P7, P24, P25, P29 and P30 are internally coupled to the contacts SDA1, SCL1, SDA2, SCL2, SDA3, SCL3, SDA4 and SCL4. The contact terminals P1 and P2 are externally coupled to the signal contacts Nsd and Nsc of the battery module 20a, respectively. The contact terminals P6 and P7 are externally coupled to the signal contacts Nsd and Nsc of the battery module 20b, respectively. The contact terminals P24 and P25 are externally coupled to the signal contacts Nsd and Nsc of the battery module 20c, respectively. The contact terminals P29 and P30 are externally coupled to the signal contacts Nsd and Nsc of the battery module 20d, respectively.

Figure 10:
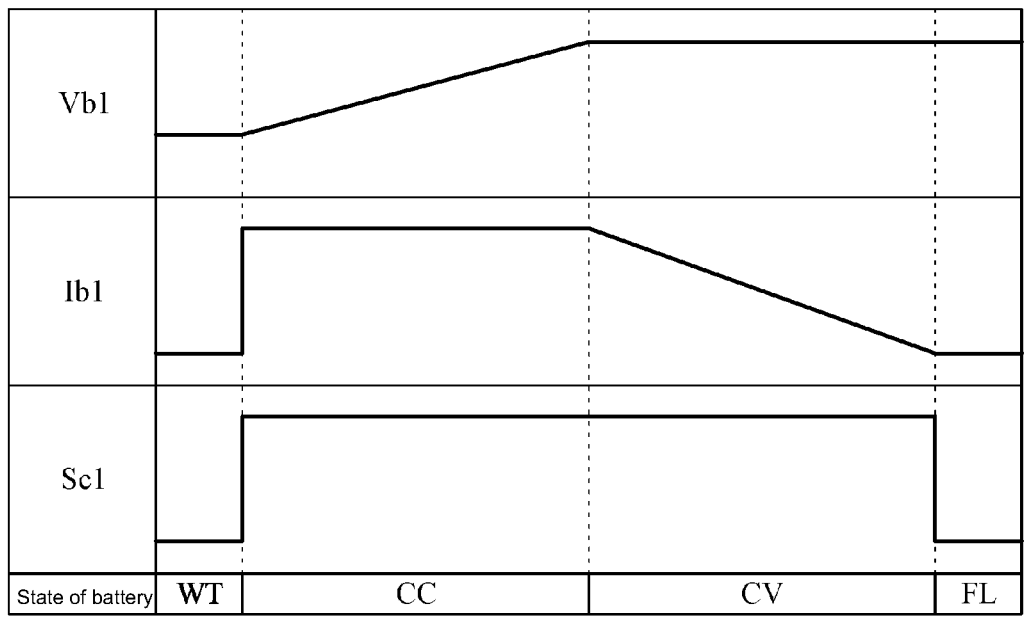
FIG. 10 is a timing diagram of associated signals when the charging device in FIG. 9 charges one single battery module.

In some embodiments, assume that the charging device 10 is implemented by the circuit in FIG. 9. When the charging device 10 is coupled to one single battery module 20a, changes in a volage Vb1 and a current Ib1 of the battery module 20a during the charging process are as shown in FIG. 10. Referring to FIG. 10, a charging signal Sc1 of the battery module 20a at a high level indicates that the battery module 20a is being charged. In the charging state, an initial stage is constant current charging CC and the later stage is constant voltage charging CV. The charging signal Sc1 of the battery module 20a at a low level indicates that the battery module 20a is in a waiting state WT or the battery module 20a is in a full state FL (i.e., the electrical capacity of the battery module 20a is full).

Figure 11:
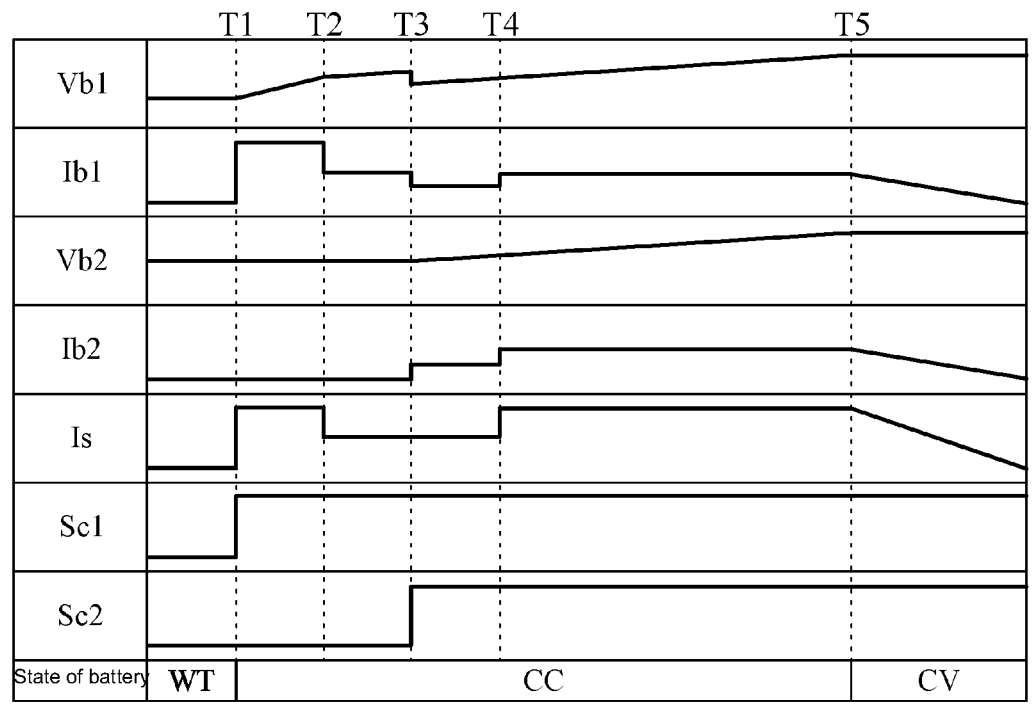
FIG. 11 is a timing diagram of associated signals when the charging device in FIG. 9 charges two battery modules.

When the charging device 10 is coupled to two battery modules 20a and 20b, the changes in the voltage Vb1 and the current Ib1 of the battery module 20a during the charging process and the changes in a voltage Vb2 and a current Ib2 of the battery module 20b during the charging process are as shown in FIG. 11. Referring to FIG. 11, the charging signal Sc1 of the battery module 20a at a high level indicates that the battery module 20a is being charged, ant a charging signal Sc2 of the battery module 20b at a high level indicates that the battery module 20b is being charged. In a period from a timing T1 and a timing T2, the battery module 20a is charged by the first current Is. The charging current Is drops to the second charging current Is at the timing T2. At a timing T3, the first switch circuit 150 is switched to be connected in parallel to the battery modules 20a and 20b, so that the second charging current Is simultaneously charges the battery modules 20a and 20b. At a timing T4, the voltages of the battery modules 20a and 20b reach stability, and the charging current Is rises back to the first charging current Is, so that the first charging current Is simultaneously charges the battery modules 20a and 20b in a period between the timing T4 and a timing T5.

Figure 12:
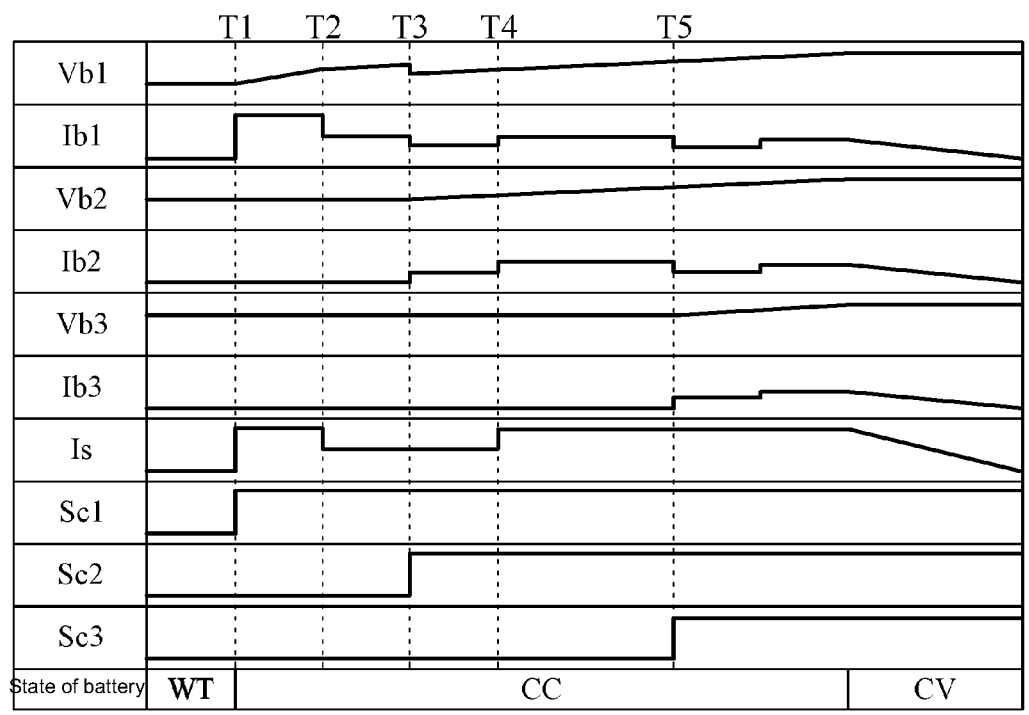
FIG. 12 is a timing diagram of associated signals when the charging device in FIG. 9 charges three battery modules.

When the charging device 10 is coupled to three battery modules 20a, 20b and 20c, the changes in the voltage Vb1 and the current Ib1 of the battery module 20a during the charging process, the changes in the voltage Vb2 and the current Ib2 of the battery module 20b during the charging process and changes in a voltage Vb3 and a current Ib3 of the battery module 20c during the charging process are as shown in FIG. 12. Referring to FIG. 12, the charging signal Sc1 of the battery module 20a at a high level indicates that the battery module 20a is being charged, the charging signal Sc2 of the battery module 20b at a high level indicates that the battery module 20b is being charged, and the charging signal Sc3 of the battery module 20c at a high level indicates that the battery module 20c is being charged. In the period between the timing T1 and the timing T2, the battery module 20a is charged by the first charging current Is. The charging current Is drops to the second charging current Is at the timing T2. At the timing T3, the first switch circuit 150 is switched to be connected in parallel to the battery modules 20a and 20b, so that the second charging current Is simultaneously charges the battery modules 20a and 20b. At the timing T4, the voltages of the battery modules 20a and 20b reach stability, and the charging current Is rises back to the first charging current Is, so that the first charging current Is simultaneously charges the battery modules 20a and 20b in the period between the timings T4 and the timing T5. At the timing T5, the first switch circuit 150 is switched to be connected in parallel to the battery modules 20a, 20b and 20c, so that the first charging current Is simultaneously charges the battery modules 20a, 20b and 20c.

Accordingly, in the period of charging multiple unbalanced battery modules 20, the charging current Is drops in response to the switching of the turned-on state of the first switch circuit 150, so that the overall charging time is decreased by about 25% and the amount of temperature rise during the overall charging process of the battery modules 20 is reduced (by about 5° C.), further increasing the cycle life of the battery modules 20 by about 5% to 10%.

In some embodiments, referring to FIG. 6 and FIG. 9, the processing chip U3 of the processing circuit 170 may be coupled to the contact terminal P12 of the connector CT, and may detect through the contact terminal P12 whether the power contacts 110 of the charging device 10 are coupled to the battery modules 20.

In some embodiments, referring to FIG. 6 and FIG. 9, the processing chip U3 of the processing circuit 170 may be coupled to a voltage detection circuit (not shown in FIG. 6) through the contact OVBAT, and detect the voltage of the parallel battery structure by the voltage detection circuit. Herein, the voltage detection circuit may be coupled to one terminal of the first switch circuit 150 coupled to the charging circuit 130. In some embodiments, the voltage detection circuit may be a voltage dividing circuit formed by multiple resistors R1 and R2.

In some embodiments, the initial state of the first switch circuit 150 is that all the switch modules 151 are turned off. In the period of charging the multiple unbalanced battery modules 20, the first switch circuit 150 first switches from the initial state to a turned-on state, so that the first charging current Is charges the connected battery module 20. The charging device 10 can reduce the charging current Is to the second charging current Is only in response to the first switch circuit 150 switching between different turned-on states for the first time. For example, the charging device 10 is coupled to four battery modules 20a to 20d. The voltage of the battery module 20b is more than the voltage of the battery module 20d, the voltage of the battery module 20d is more than the voltage of the battery module 20c, and the voltage of the battery module 20c is more than the voltage of the battery module 20a. Herein, the first switch circuit 150 first switches from the initial state to a first turned-on state, and the charging current Is provided to the first switch circuit 150 is the first charging current Is. The first turned-on state is that the charging circuit 130 is connected to the power contact 110a but is disconnected from the remaining power contacts 110b to 110d. In the period including the first switch circuit 150 is switched from the first turned-on state to a second turned-on state, the charging current Is provided to the first switch circuit 150 drops to the second charging current Is. The second turned-on state is that the charging circuit 130 is connected to the power contacts 110a and 110c, and disconnected from the remaining power contacts 110b and 110d. When the voltages of the battery modules 20a and 20c are stable, the charging current Is provided to the first switch circuit 150 rises back to the first charging current Is. Even if the first switch circuit 150 is subsequently switched from the second turned-on state to a third turned-on state, the charging current Is provided to the first switch circuit 150 is kept being the first charging current Is. The third turned-on state is that the charging circuit 130 is connected to the power contacts 110a, 110c and 110d, and disconnected from the remaining power contact 110b.

In some embodiments, during the period of charging the multiple unbalanced battery modules 20, the charging device 10 can reduce the charging current Is to the second charging current Is in response to each time the first switch circuit 150 switches to different turned-on states.

In conclusion of the above, the charging method according to any one of the embodiments is applicable to the charging device 10, and is capable of decreasing the overall charging time and reducing the amount of temperature rise in the battery modules 20 during the overall charging process, further increasing the cycle life of the battery modules 20. In some embodiments, the charging method is applicable to the charging device 10, so as to provide different charging procedures according to the number of battery modules 20 coupled.

What is claimed is:

1. A charging method, comprising:
    detecting whether a plurality of battery modules are balanced;
    when the plurality of battery modules are balanced, simultaneously charging the plurality of battery modules by a first charging current; and
    when the plurality of battery modules are not balanced, performing a specific procedure, the step of executing the specific charging procedure comprising:
        charging a first battery module lower than a balance voltage, among the plurality of battery modules, by the first charging current, and disconnecting the first charging current from remaining of the plurality of battery modules; and
        upon the first battery module reaching the balance voltage, simultaneously charging the first battery module and at least one battery module having the balance voltage among the plurality of battery modules by a second charging current, wherein the second charging current is less than the first charging current.

2. The charging method according to claim 1, wherein the step of executing the specific charging procedure further comprises:
    when a voltage of the first battery module is stable, switching to simultaneously charging the first battery module and the at least one battery module by the first charging current.

3. The charging method according to claim 1, wherein the plurality of battery modules are balanced when open-circuit voltages of the plurality of battery modules are the same.

4. The charging method according to claim 1, wherein the balance voltage is an open-circuit voltage of a second battery module among the plurality of battery modules that are not balanced, and among the plurality of battery modules that are not balanced, the open-circuit voltage of the second battery module is higher than and second to only an open-circuit voltage of the first battery module.

5. The charging method according to claim 1, wherein the step of simultaneously charging the plurality of battery modules by the first charging current comprises:
    connecting the plurality of battery modules in parallel to form a parallel battery structure; and
    charging the parallel battery structure by the first charging current.

6. The charging method according to claim 1, wherein the step of simultaneously charging the first battery module and the at least one battery module having the balance voltage among the plurality of battery modules by the second charging current comprises:
    connecting the first battery module and the at least one battery module in parallel to form a parallel battery structure; and
    charging the parallel battery structure by the second charging current.

7. The charging method according to claim 6, wherein the step of executing the specific charging procedure further comprises:
    when a voltage of the parallel battery structure is stable, switching to simultaneously charging the parallel battery structure by the first charging current.

8. The charging method according to any one of claim 1, further comprising:
    before the step of detecting whether the plurality of battery modules are balanced, detecting the number of the battery module of a system;
    when the number of the battery module is plural, performing the step of detecting whether the plurality of battery modules are balanced; and
    when the number of the battery module is singular, charging the single battery module of the system by a third charging current.

9. A charging method, comprising:
    detecting whether two battery modules are balanced;
    when the two battery modules are balanced, simultaneously charging the two battery modules by a first charging current; and
    when the two battery modules are not balanced, executing a specific charging procedure, the specific charging procedure comprising:
        charging a first battery module between the two battery modules that is not balanced by the first charging current, and disconnecting the other between the two battery modules; and upon the first battery module reaching the balance, simultaneously charging the two battery modules by a second charging current, wherein the second charging current is less than the first charging current.

10. A charging device, comprising:
a plurality of power contacts, each of which adapted to connect to a power module;
a charging circuit;
a switch circuit, coupled between the charging circuit and the individual power contacts, switching electrical connection between the charging circuit and the individual power contacts; and
a processing circuit, coupled to the switch circuit to control switching of the switch circuit;
wherein, when the plurality of power contacts are coupled to the plurality of battery modules, the processing circuit further detects whether the plurality of battery modules are balanced;
wherein, when the plurality of battery modules are balanced, the processing circuit controls the switch circuit to connect the power contacts coupled with the plurality of battery modules to the charging circuit, and enables the charging circuit to charge the plurality of battery modules by a first charging current; and
wherein, when the plurality of battery modules are not balanced, the processing circuit performs a specific charging procedure, wherein in the specific charging procedure, the processing circuit controls the switch circuit to connect the power contact coupled with a first battery module lower than a balance voltage among the plurality of battery modules to the charging circuit, and controls the charging circuit to charge the first battery module by the first charging current; upon the first battery module reaching the balance voltage, the processing circuit controls the switch circuit to connect the plurality of power contacts coupled with the plurality of battery modules having the balance voltage among the plurality of battery modules to the charging circuit, and controls the charging circuit to charge the plurality of battery modules having the balance voltage by a second charging current less than the first charging current.

11. The charging method according to claim 1, wherein the step of detecting whether the plurality of battery modules are balanced further comprises:
determining whether voltages of all of the plurality of battery modules are within a predetermined error range;
wherein the plurality of battery modules are balanced when the voltages of all of the plurality of battery modules are determined to be within the predetermined error range; and
wherein the plurality of battery modules are not balanced when a voltage of at least one of the plurality of battery modules is determined to exceed the predetermined error range.

12. The charging method according to claim 11, wherein the step of determining whether the voltages of all of the plurality of battery modules are within the predetermined error range further comprises:
determining whether a difference between two adjacent voltages among the voltages of all of the plurality of battery modules is less than or equal to a first predetermined error value;
wherein the voltages of all of the plurality of battery modules are within the predetermined error range when the difference between the two adjacent voltages among the voltages of all of the plurality of battery modules is determined to be less than or equal to the first predetermined error value; and
wherein the voltage of the at least one of the plurality of battery modules exceeds the predetermined error range when the two adjacent voltages among the voltages of all of the plurality of battery modules is determined to be more than the first predetermined error value.

13. The charging method according to claim 12, wherein the first predetermined error value is a value equal to or more than 0 Volt and less than 1 Volt.

14. The charging method according to claim 11, wherein the step of determining whether the voltages of all of the plurality of battery modules are within the predetermined error range further comprises:
determining whether a difference between a maximum voltage and a minimum voltage among the voltages of all of the plurality of battery modules is less than or equal to a first predetermined error value;
wherein the voltages of all of the plurality of battery modules are within the predetermined error range when the difference between the maximum voltage and the minimum voltage is determined to be less than or equal to the first predetermined error value; and
wherein the voltage of the at least one of the plurality of battery modules exceeds the predetermined error range when a voltage of one of the plurality of battery modules falls outside a range formed by the maximum voltage and the difference between the maximum voltage and the first predetermined error value.

15. The charging method according to claim 14, wherein the first predetermined error value is a value equal to or more than 0 Volt and less than 1 Volt.

16. The charging method according to claim 4, wherein prior to the step of charging the first battery module by the first charging current, a difference between the open-circuit voltage of the first battery module and the balance voltage is more than a second predetermined error value.

17. The charging method according to claim 16, wherein the step of executing the specific charging procedure further comprises:
during the step of charging the first battery module by the first charging current, determining whether the first battery module reaches the balance voltage according to a difference between the open-circuit voltage of the first battery module and the balance voltage and the second predetermined error value;
wherein the first battery module is determined to reach the balance voltage when the difference between the open-circuit voltage of the first battery module and the balance voltage is less than or equal to the second predetermined error value.

18. The charging method according to claim 16, wherein the second predetermined error value is a value equal to or more than 0 Volt and less than 1 Volt.

19. The charging method according to claim 2, wherein the step of executing the specific charging procedure further comprises:
upon the first battery module reaching the balance voltage, activating a timer for determining whether the voltage of the first battery module is stable;
wherein the voltage of the first battery module is determined to be stable when the timer reaches a specific timing.

20. The charging method according to claim 7, wherein the step of executing the specific charging procedure further comprises:

upon forming the parallel battery structure, activating a timer for determining whether the voltage of the parallel battery structure is stable;

wherein the voltage of the parallel battery structure is determined to be stable when the timer reaches a specific timing.

\* \* \* \* \*